United States Patent [19]

Negre

[11] Patent Number: 5,400,552
[45] Date of Patent: Mar. 28, 1995

[54] PREVENTIVE DEVICE AGAINST NUISANCE FROM BIRDS

[75] Inventor: Gilles Negre, Le Plessis-Belleville, France

[73] Assignee: Spit Ecopic Line, Fontenay sous Bois, France

[21] Appl. No.: 75,462

[22] PCT Filed: Oct. 14, 1992

[86] PCT No.: PCT/FR92/00972

§ 371 Date: Jun. 15, 1993

§ 102(e) Date: Jun. 15, 1993

[87] PCT Pub. No.: WO93/07744

PCT Pub. Date: Apr. 29, 1993

[30] Foreign Application Priority Data

Oct. 16, 1991 [FR] France .............. 91 12761

[51] Int. Cl.⁶ .............................................. E04B 1/72
[52] U.S. Cl. ................................................ 52/101
[58] Field of Search ..................................... 52/101

[56] References Cited

U.S. PATENT DOCUMENTS

| | | | |
|---|---|---|---|
| 168,446 | 10/1875 | Blodget | 52/101 |
| 2,298,194 | 10/1942 | Caldwell . | |
| 2,306,080 | 12/1942 | Peles | 52/101 |
| 2,308,893 | 1/1943 | Pavloff et al. | 52/101 |
| 2,887,730 | 5/1959 | Bittner . | |
| 2,938,243 | 5/1960 | Peles | 52/101 |
| 3,282,000 | 11/1966 | Shaw et al. . | |
| 3,407,550 | 10/1968 | Shaw | 52/101 |
| 4,997,721 | 3/1991 | Shaw | 52/101 X |

FOREIGN PATENT DOCUMENTS

| | | |
|---|---|---|
| 440 | 1/1979 | European Pat. Off. . |
| 0340108A1 | 11/1989 | European Pat. Off. . |
| 1316598 | 12/1962 | France . |
| 2556932 | 6/1985 | France . |
| 163908 | 9/1904 | Germany .............. 52/101 |
| 492101 | 2/1930 | Germany .............. 52/101 |
| 1757735 | 7/1971 | Germany . |
| 8412524 U | 6/1984 | Germany . |
| 8906216 | 8/1989 | Germany . |
| 2-045326 | 2/1990 | Japan . |
| 3969 | 2/1905 | United Kingdom ........ 52/101 |

Primary Examiner—Carl D. Friedman
Assistant Examiner—Kevin D. Wilkens
Attorney, Agent, or Firm—Donald J. Pagel, Jr.

[57] ABSTRACT

A preventative device against nuisance from birds comprised of a base to which spikes are fitted vertically on the side opposite surfaces of a structure to be protected in order to discourage birds from landing on those surfaces. The base is provided with canals, and each spike has a protuberance obtained by flattening the material of which it is made. The protuberance is slightly larger than the cross section of the canals. The spikes are force fit into the canals so as to be held firmly therein. In an embodiment of the invention, the base of the device is made from polymethylmethacrylate. In another embodiment, the adhesive used to secure the base to the surface being protected is a neutral silicone adhesive.

20 Claims, 3 Drawing Sheets

PREVENTIVE DEVICE AGAINST NUISANCE FROM BIRDS

BACKGROUND OF THE INVENTION

1. Field of the Invention

This invention relates to bird proofing assemblies, and more particularly to a device for preventing birds from alighting on certain surfaces.

2. Description of the Prior Art

One knows that birds often try to alight on even the narrowest surfaces that they can find on outer structures of buildings: window sashes, sills, ledges, statues, wall ridge, roof gutter, portal, bridge, tower, mast, etc.

This alighting and resting is a nuisance in that the birds, through their droppings, dirty and damage not only the landing surface, but also all outer structures of the building that are underneath.

Due to aesthetic reasons, and also to avoid irreversible damaging of the structure material, one is often obliged to deal with frequent and expensive renovation work of the damaged parts of the building.

Besides, such a building is quite often located next to human activities. This is for example the case in cities, where such birds' droppings as well as birds' cries might commercially impact a whole area, whether it be a living area, a mall area or restaurants.

One of the most efficient ways of preventing this nuisance consists in covering surfaces on which birds alighting is not welcome, with a device comprising a bottom base support from which extend upwardly birds' dissuasive spike elements.

It can be demonstrated that such a device does not hurt the birds but only prevents alighting and resting.

Such a device is described in European patent application number 0 340 108, published on Nov. 2nd, 1989. The base support of the device, having a smooth surface on both its sides, has a thickness purposely reduced for both cost and aesthetic impact on covered structures reasons.

For these two same reasons, the spike elements diameter is reduced whilst the distance between two adjacent spike elements depends on the size of the birds at which the device is aimed.

To ensure fastening of the spike elements to the base support, canals of a diameter slightly larger than that of the spike elements are drilled through the base support, in which said spike elements are introduced and fastened with a usual type of glue. The base support is also attached to the surfaces to be covered through usual gluing.

Such a system however features three main drawbacks:

The quality of fastening of the spike elements to the base support degrades with time, under the combined action of weather (sun, frost), and the repeated attempts by the birds to upset this obstacle to their alighting. Little by little, the glue degrades and the spike elements are then one by one pulled off the base support, thereby rending very quickly the system completely inefficient.

Weather is also harmful to the material of which the base support is made: it usually becomes inaesthetically yellowish, and loses its elastic properties, so that if a lateral pressure is exercised on a spike element by a bird, the base support will break around the point where the spike element is fastened, also rending the system completely inefficient.

The glue usually used to attach the base to the surfaces to be covered is also sensitive to weather conditions. Moreover, being in contact with the building, it is susceptible of degrading such a building by chemical reaction. Finally, if the system is taken away, particles at the surface of the building might be pulled off at the same time the glue is.

SUMMARY OF THE INVENTION

It is therefore an object of the present invention to provide a system to overcome the above mentioned drawbacks. The system according to the present invention comprises a base support attached to a surface to be protected against birds alighting. Dissuasive spike elements extend from a side of the base support, opposite to the side attached to the surface to be protected. The base support features canals, and each spike includes a protruding portion. The protruding portion is obtained by flattening out of the material of which each spike element is made, and of a size slightly larger than the diameter of the canals. The spike elements are then forced into the canals so as to ensure fastening of the spike elements to the base support.

In one embodiment of the invention, the base support is made of polymethylmethacrylate.

In another embodiment of the invention, a neutral silicone glue is used to attach the base support to a surface to be covered.

BRIEF DESCRIPTION OF THE DRAWINGS

The invention will be better understood from the following detailed description read in conjunction with the following drawings.

DETAILED DESCRIPTION OF THE PREFERRED EMBODIMENT OF THE INVENTION

Figure 1:
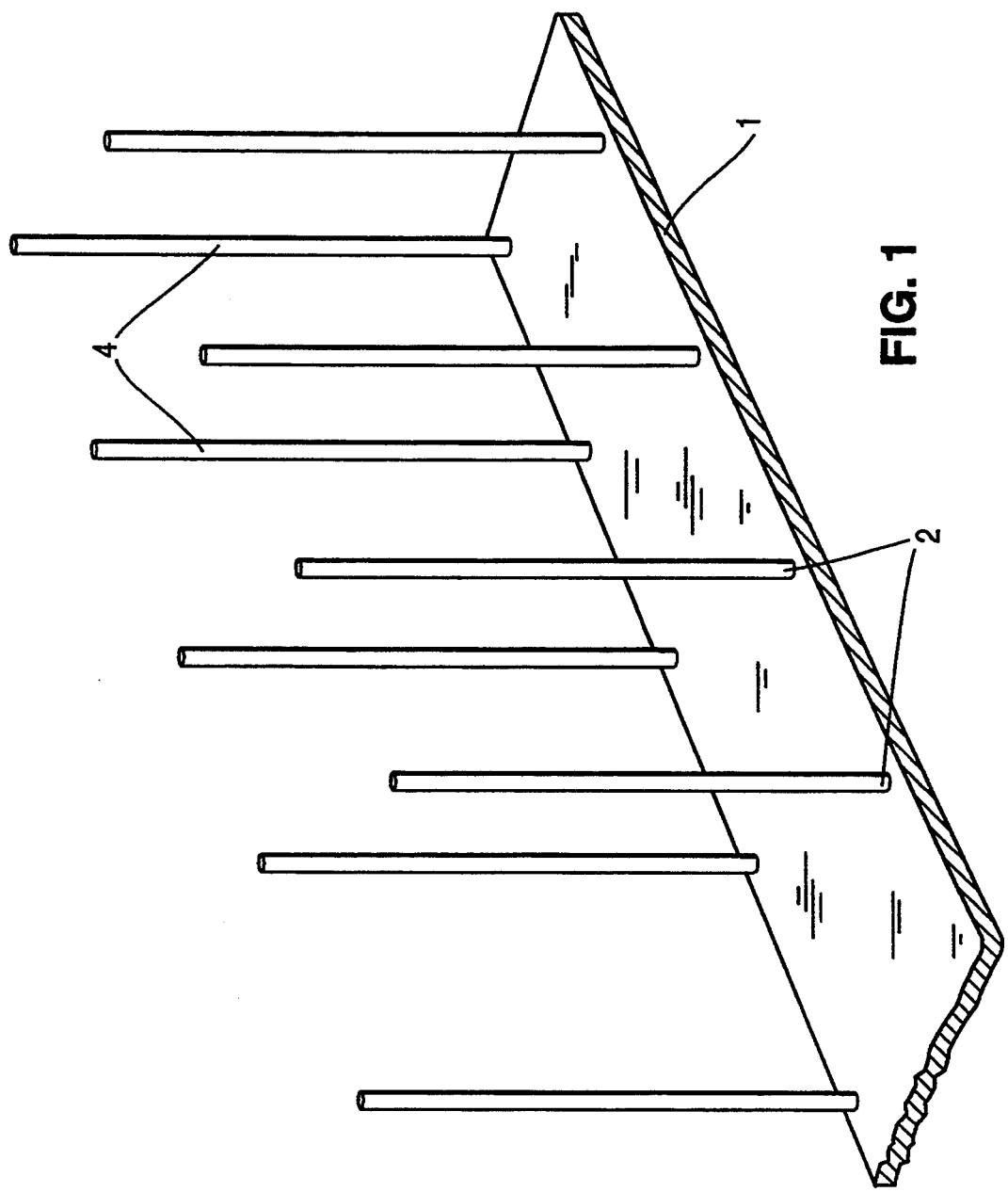
FIG. 1 is a view in perspective of a preferred embodiment of the present invention.

FIG. 1 is a view in perspective of the device constructed according to the principles of the present invention. A base support 1 comprises canals 2 in each of which is lodged a spike element 4. In use, the base support 1 is attached to a surface to protect (not shown) against birds alighting. The base support 1 can be made of a great variety of materials including wood, metal and plastics, but in the preferred embodiment polymethylmethacrylate is used for its resistance qualities to impacts, temperature variations and ultraviolet waves from the sun, that allows to ensure stability throughout time of elastic properties as well as color of the base support.

At manufacturing time, the axis of the canals can show with the base support plan an angle comprised between 30 and 90 degrees, in case inclination of the spike elements vis-a-vis the surface to be covered is required.

The upper surface of the base support does not show any ruggedness which would otherwise retain dust, detritus, leaves, etc. The bottom surface on the contrary can be granulated so as to ensure optimized adherence when gluing to the surface to be covered.

Figure 2:
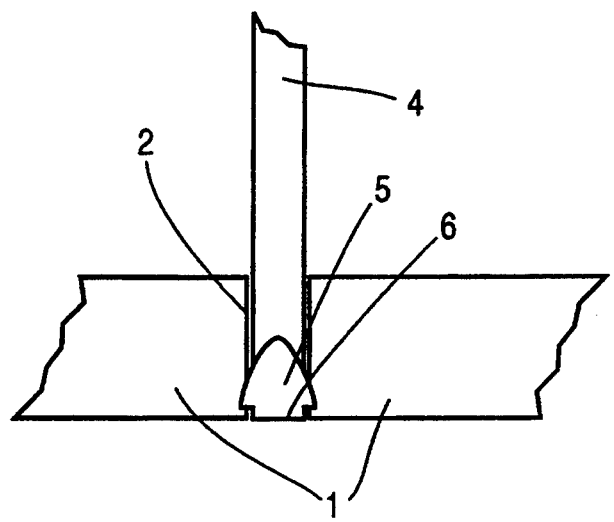
FIG. 2 is a transverse view in section showing a spike element fastened to a base support of the present invention.

FIG. 2 is a transverse view in section of the fastening of a spike element to the base support 1. The base support comprises a canal 2 in which is lodged a tip 6 of the spike element 4. The spike element 4 features a protruding portion of a size slightly larger than the diameter of the canal 2, at a distance from the bottom tip smaller than the length of a canal.

The canal can go clear through the base support, in which case, at manufacturing time, the spike element 4 is engaged through one opening of the canal 2 on the bottom surface of the base support, then forced into the canal 2, until its bottom extremity becomes even with said bottom surface. Fastening is ensured by the protruding portion 5 of the spike element 4 deforming inside the canal 2, the material of which the base support is made. The protruding portion 5 also allows automatic centering of the spike element along the axis of the canals. In another embodiment not shown, the canal 2 does not go clear thru the base support, but has only one opening on the upper surface of the base support; in that case, the spike element is also engaged thru this latter opening and forced in the canal.

The protruding portion 5 is obtained by flattening out of the material of which the spike element 4 is made: this material must therefore be malleable enough so as to not be rendered fragile by the flattening out. Amongst materials with required characteristics, stainless steel 302 (DIN 17224) allows a spike element of a diameter of 1.3 mm, with a protruding part of 1.53 mm. The protruding portion 5 can be cone-shaped as shown on the figure, but other shapes can be contemplated. Also, spike elements 4 and canals 2 could have as a cross-section a parallelepiped, a circle or a triangle. The tool that carries out the flattening out is a stamper machine well-known to the man-skilled-in-the-art.

Figure 3:
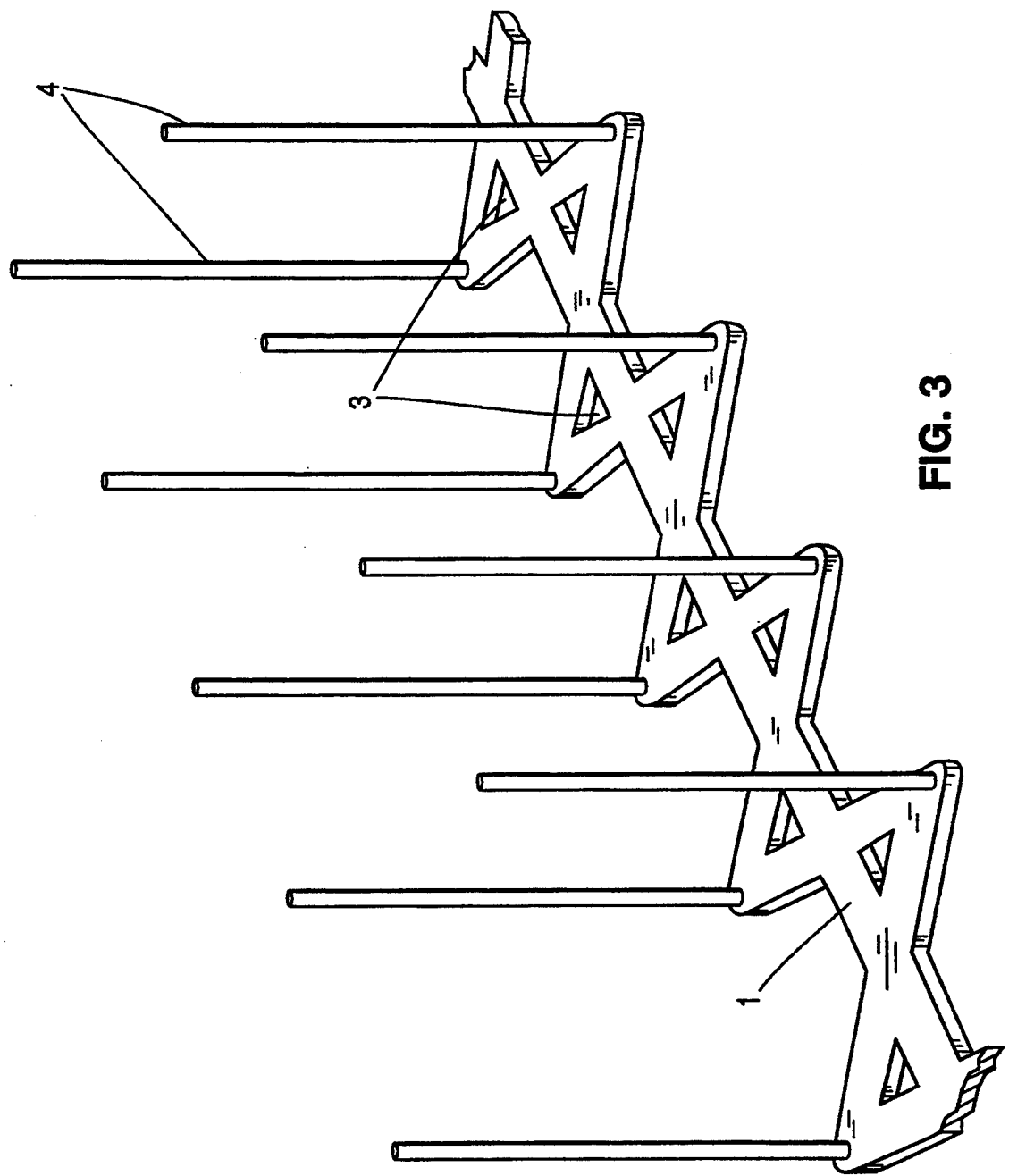
FIG. 3 is a view in perspective of another embodiment of the present invention.

FIG. 3 is a view in perspective of an alternative embodiment of the present invention. A particular shape of the base support 1 is shown, which is only one of several possible shapes. This embodiment features a plurality of hollow regions 3 formed in the base support 1. The shape of the hollow regions 3 is not critical (figure shows a triangle), but their side-walls are sloped and splay out downwardly from the top to bottom surface of the base support. The area to protect is covered with glue 7, and the device is pressed against the glue 7. The said glue 7 then overflows along the side-walls of the hollow regions 3, on to the top surface of the base support 1 where it secures the base support against the area to protect. As the glue 7 hardens, the glue 7 residing in the hollow regions 3 and on the base support 1 forms a substantially frusto-conical configuration, substantially similar to a screw head. In one embodiment of the invention, the chosen glue 7 is a neutral silicone which adheres on any material, and does not involve any secondary chemical effects. Moreover, such a glue 7 does not impregnate even the most porous materials, so that if one wishes to take the device of the invention away from the covered surface, he needs only pull off the base support 1 together with the hardened glue 7, without any damage to the material of the protected area.

Figure 4:
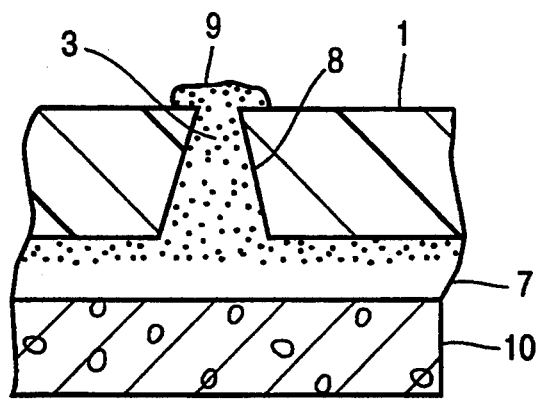
FIG. 4 is a cross-sectional view of one of the hollow regions shown in FIG. 3.

FIG. 4 illustrates the hollow regions 3 with the side-walls 8 splaying out downwardly from the top to the bottom. The hollowing-out 3 is filled with the glue 7 which flows out onto the base support 1 forming a head 9. This effectively secures the base support 1 to a surface 10 to be protected from birds.

Figure 5:
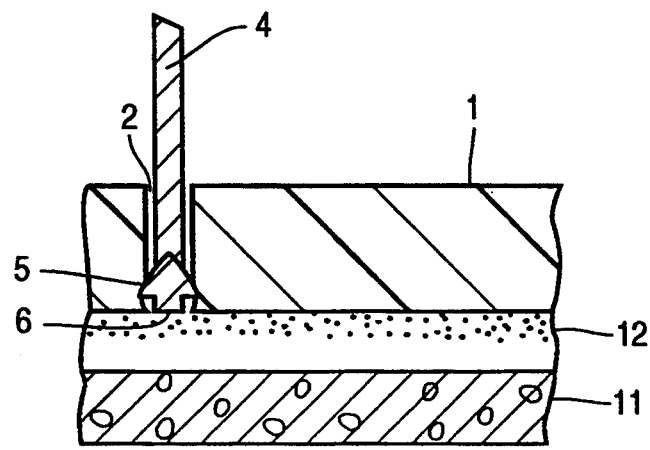
FIG. 5 is a cross-sectional view showing the device of FIG. 1 attached to a surface to be protected from birds by a layer of glue.

FIG. 5 illustrates how the base support 1 shown in FIG. 1, is attached to a surface 11 to be protected from birds by a layer of glue 12.

What is claimed is:

1. A bird proofing device comprising:
   a base support for attachment to a surface to be protected;
   a plurality of canals extending completely through said base support with each of said canals having a first diameter; and
   a plurality of spike elements, one spike element inserted in each of said canals and extending above said base support, each spike element having a protruding portion, each protruding portion formed by a flattened out portion on one of said spike elements, each of the protruding portions having a second diameter greater than the first diameter of said canals, and each of said spike elements having at least one protruding portion positioned inside of one of said canals, whereby each spike element is secured in one of said canals by at least one of said protruding portions.

2. The device of claim 1 wherein at least one of said spike elements is inclined at an angle of from 30 to 90 degrees with the base support.

3. The device of claim 1 wherein the protruding portion of one of said spike elements substantially aligns a longitudinal axis of the one spike element with a longitudinal axis of the canal in which the one spike element is inserted.

4. The device of claim 1 wherein the protruding portions of each of said spike elements comprises a substantially cone-shaped configuration.

5. The device of claim 1 wherein said base support comprises polymethylmethacrylate.

6. The device of claim 1 wherein at least one of said spike elements comprises stainless steel.

7. The device of claim 1 further comprising:
   a layer of neutral silicone glue for attaching said base support to the surface to be protected.

8. The device of claim 1 further comprising:
   a plurality of attachment means for providing regions into which glue can flow, said attachment means comprising a plurality of apertures extending completely through said base support.

9. The device of claim 8 wherein each of said apertures have sloped side walls that are splayed downwardly from an upper surface toward a bottom surface of said base support.

10. The device of claim 8 further comprising:
    a layer of neutral silicone glue for attaching said base support to the surface to be protected and wherein the attachment means are filled with the neutral silicone glue.

11. A bird proofing device comprising:
    a base support for attachment to a surface to be protected, the base support having a bottom surface and a top surface;
    a plurality of canals extending completely through said base support from said bottom surface to said top surface, each of said canals having a first diameter;
    a plurality of spike elements, one spike element inserted in each of said canals and extending above said base support; and a plurality of bottom tips with each bottom tip forming one end of each spike element, each of said spike elements having the bottom tip positioned in one of said canals substantially flush with said bottom surface of the base support, each spike element having a protruding portion, each protruding portion formed by a flattened out portion on one of said spike elements, each of the protruding portions being positioned above said bottom tip within one of said canals and having a second diameter greater than the first diameter of said canals such that the protruding portion deforms the one canal in which it is positioned, whereby each spike element is secured in one of said canals by at least one of said protruding portions.

12. The device of claim 11 wherein at least one of said spike elements is inclined at angle of from 30 to 90 degrees with the base support.

13. The device of claim 11 wherein the protruding portion of one of said spike elements substantially aligns a longitudinal axis of the one spike element with a longitudinal axis of the canal in which the one spike element is inserted.

14. The device of claim 11 wherein said base support comprises polymethylmethacrylate.

15. The device of claim 11 wherein at least one of said spike elements comprises stainless steel.

16. The device of claim 11 further comprising:
a layer of neutral silicone glue for attaching said base support to the surface to be protected.

17. The device of claim 11 further comprising:
a plurality of attachment means for providing regions into which glue can flow, said attachment means comprising a plurality of apertures extending completely through said base support.

18. The device of claim 17 wherein each of said apertures have sloped side walls that are splayed downwardly from an upper surface toward a bottom surface of said base support.

19. The device of claim 17 further comprising:
a layer of neutral silicone glue for attaching said base support to the surface to be protected and wherein the attachment means are filled with the neutral silicone glue.

20. A method of fabricating a bird proofing device adapted for attachment to a surface to be protected, said method comprising the steps of:
providing a base support member;
forming a plurality of canals through said base support, such that said canals extend from an upper surface through a bottom surface of said base support;
providing a plurality of spike element, one spike element provided for each canal;
flattening a portion of each of said spike elements adjacent to a bottom tip thereof to form a cone-shaped protruding portion, said protruding portion being formed adjacent to said bottom tip at a distance less than the length of said canals; and
disposing each of said spike elements through each of said canals, such that the protruding portion of said spike elements resides in each of said canals with the bottom tip of said spike elements disposed substantially flush with the bottom surface of said base support, the protruding portions having a diameter greater than the diameter of said canals to deform each of said canals to fasten said spike elements to said base support.

* * * * *